Patented Oct. 21, 1924.

1,512,177

UNITED STATES PATENT OFFICE.

PAUL KEEVER, OF WEST CHESTER, PENNSYLVANIA, ASSIGNOR TO WHITE HEAT PRODUCTS COMPANY, OF WEST CHESTER, PENNSYLVANIA, A CORPORATION OF PENNSYLVANIA.

PROCESS OF FORMING ABRADING ARTICLES.

No Drawing.   Application filed November 29, 1921.   Serial No. 518,577.

*To all whom it may concern:*

Be it known that I, PAUL KEEVER, a citizen of the United States, residing at West Chester, in the county of Chester, State of Pennsylvania, have invented certain new and useful Improvements in Processes of Forming Abrading Articles, of which the following is a description, reference being had to the accompanying drawing, and to the figures of reference marked thereon.

My invention relates to the manufacture of abrading wheels and other articles, and has for its object the manufacture of such articles which shall have the required density and porosity, as well as other desirable characteristics, and which has for a further object the production of such articles by a process which is economical with respect to labor, apparatus and time required, and which permits of the firing of the molded or shaped article immediately after it is shaped, thus eliminating the hitherto essential step of drying.

My new process, generally stated, comprises mixing abrasive grains with a solid binder; for example, dry clays, dry feldspars, dry sands, etc., pulverized or granular, which may then be slightly moistened with a suitable liquid which is used in sufficient amount to permit of shaping the article conveniently which may be accomplished by molding under pressure, but in such small amount that the article will be so dry that it can be subjected to any desired temperature immediately after molding or shaping, even to a baking heat, so that it may be baked if desired as soon as it is shaped, thus permitting of the elimination of the step of drying. In making up my composition, I use the solid ingredients of the binder material preferably in a dry powdered or granular condition, as a homogeneous wheel mass will result from the use of small particles such as powder, and pore structure can be modified using granular binders, and I prefer to use them dry for the purpose of easy and accurate control of the amount of liquid present at the time of molding.

I have found that water in the amounts of 2%, or even somewhat less, calculated on the weight of total solids, that is, of the weight of the abrasive grains plus the weight of the solid binder, will produce a mass which will hold its shape after molding, and which will be so dry that it may be fired immediately after molding without any substantial distortion of the shaped article taking place. I may use other fluids than water, for example, oils, such as linseed oil or core oil, sodium silicate, molasses, etc., and these are also used in small quantities, the exact amount thereof to be used depending upon the materials and the proportions thereof used. I may state, by way of example, that the oil may be used alone, without water, or together with water, and the amount thereof should be approximately the same as that of the water which it replaces; the proportion of oil to water, in the mixed fluid may be varied and no particular proportions are essential.

The binding material may be varied considerably as to its ingredients and the proportions thereof, and I give below three examples of compositions of matter that will produce excellent abrading wheels or other articles.

*Example No. 1.*

454 parts by weight of abrasive grains, 50 parts by weight of dry powdered clay; and 12 parts by weight of water.

*Example No. 2.*

454 parts by weight of abrasive grains, 100 parts by weight of dry powdered glass and dry powdered clay, and 12 parts by weight of water.

*Example No. 3.*

454 parts by weight of abrasive grains, 113 parts by weight of dry powdered sodium silicate and dry powdered feldspar, and 12 parts by weight of water.

The compositions above indicated may be varied considerably as to ingredients and proportions thereof; ball clay, slip clay, kaolin, porcelain clay, china clay, and feldspar may be used in place of the clay specified in each of the above examples and other materials may also be used. While the proportions given in these examples produce excellent articles, they may nevertheless be considerably varied.

It is essential that there be some binder present in the composition of matter which will cause it to retain the shape given it without distortion thereof after it is molded and it is also essential that there be some binder present which will cause the article to retain its shape without distortion after the step of firing has been completed. The first mentioned binder may be merely a temporary one, the binding property of which disappears on firing the article at which time the second or permanent binder comes into play, or the binder may be of such nature that it will act as the first mentioned or temporary, as well as the second mentioned or permanent binder. In the examples given the clays particularly, and possibly the feldspar, when subjected to pressure in the presence of the small amount of water act as the temporary binders. Upon baking the water evaporates and the clays, feldspars, dry sodium silicates and glass become permanent binders.

Having thus described my invention, what I claim as new and desire to secure by Letters Patent, is:

1. The method of making an abrading article which comprises adding to a mass of dry solids including powdered or granular silicious binding material and abrasive grains an amount of fluid less than 3% of the weight of said solids, molding said mass and firing the shaped article.

2. The method of making an abrading article which comprises adding to a mass of dry solids containing powdered or granular silicious binding material and abrasive grains an amount of fluid less than 3% of the weight of said solids, molding said mass and then immediately firing the shaped article.

3. The method of making an abrading article which comprises adding to a mass of dry solids including powdered or granular vitrifiable binding material and abrasive grains an amount of fluid less than 3% of the weight of said solids, molding said mass and firing the shaped article.

4. The method of making an abrading article which comprises adding to a mass of dry solids containing powdered or granular vitrifiable binding material and abrasive grains an amount of fluid less than three per cent of the weight of said solids, molding said mass and then immediately firing the shaped article.

5. The method of making an abrading article which comprises mixing a mass composed of abrasive grains, binding material and a fluid amounting to less than 3% of the weight of the solids, molding the mass and firing it.

6. The method of making an abrading article which comprises adding to a dry mass containing abrasive grains and powdered clay an amount of fluid which is about 2% of the weight of the dry mass, molding the mass and firing it.

7. The method of making an abrading article which comprises adding to a dry mass containing abrasive grains and powdered clay an amount of fluid which is about 2% of the weight of the dry mass, molding the mass, and then immediately firing it.

In testimony whereof, I affix my signature.

PAUL KEEVER.